United States Patent
Bennett

(10) Patent No.: US 6,633,587 B1
(45) Date of Patent: *Oct. 14, 2003

(54) SYSTEM AND METHOD FOR DELIVERING RELIABLE DATAGRAM SERVICE THROUGH CONNECTION-ORIENTED SERVICE

(75) Inventor: David C. Bennett, Apex, NC (US)

(73) Assignee: WorldCom, Inc., Clinton, MS (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/383,896

(22) Filed: Aug. 26, 1999

(51) Int. Cl.⁷ .................................................. H04J 3/16
(52) U.S. Cl. ..................... 370/469; 370/389; 370/386; 709/230
(58) Field of Search ................................ 370/469, 355, 370/397, 338, 352–354, 356, 400, 401, 466, 467, 392, 389, 386, 399, 473, 474, 229; 713/1, 201; 709/203, 208, 227, 228, 230, 238, 221; 379/93.01

(56) References Cited

U.S. PATENT DOCUMENTS

| | | | | |
|---|---|---|---|---|
| 5,818,842 A | * | 10/1998 | Burwell et al. | 370/397 |
| 5,903,559 A | * | 5/1999 | Acharya et al. | 370/355 |
| 6,046,979 A | * | 4/2000 | Bauman | 370/229 |
| 6,115,393 A | * | 9/2000 | Engel et al. | 370/469 |
| 6,405,247 B1 | * | 6/2002 | Lawande et al. | 709/221 |
| 6,446,200 B1 | * | 9/2002 | Ball et al. | 713/1 |

* cited by examiner

*Primary Examiner*—Hassan Kizou
*Assistant Examiner*—John Pezzlo

(57) ABSTRACT

A system and method for reliably delivery of datagram protocol data unit (PDU) packets generated by a network oriented application at a first computing network element to a second computing network element across a network. The method steps include: at the first computing network element, capturing generated datagram packets destined for the second computing network element; determining a size of a payload associated with the datagram and communicating the size of the payload to the second computing element via a reliable connection-oriented transport service; communicating the actual payload to the second computing element via the reliable connection-oriented transport service; and, at the second computing network element, utilizing payload size and payload to reconstruct a datagram PDU including the payload for a network application at the second computing network element. By this technique, reliable datagram PDU transport over the network is ensured.

19 Claims, 4 Drawing Sheets

SYSTEM AND METHOD FOR DELIVERING RELIABLE DATAGRAM SERVICE THROUGH CONNECTION-ORIENTED SERVICE

FIELD OF THE INVENTION

The present invention relates generally to packet communications across networks, and particularly, to an improved connection-oriented communications system for providing reliable datagram packet-based communications.

BACKGROUND OF THE INVENTION

Currently, a datagram-based communications protocol known as the Simple Network Management Protocol ("SNMP"), is implemented to perform network management of vendor telecommunications equipment over long distances across local area networks (LANs) and wide area networks (WANs). For example, in the system 10 as shown in FIG. 1, many vendors 12 of a telecommunications carrier 15 (e.g., MCIWorldcom, assignee of the present invention) rely on SNMP communications to manage their equipment across a LAN/WAN 20. Thus, a piece of equipment 13 may generate a message about its operational state and this message may be communicated via SNMP from the equipment to MCIWorldcom's network management software 16 across the network. In another example implementation, a network operation, administrator or maintenance center, e.g., located in North Carolina, may be required to provision switches remotely located across the country, e.g., in Texas, via a WAN.

It is the case that the Simple Network Management Protocol is an unreliable protocol, based on the Internet Protocol Suite's Uniform Datagram Packet ("UDP") protocol. An unreliable protocol is one that does not guarantee delivery of information to its network destination, and thus requires retransmission of datagrams with error management being pushed up into the application layer. Thus, in the above-described example, datagrams traveling between North Carolina and Texas via SNMP may be routinely dropped in the WAN 20, possibly causing provisioning activity to fail. Obviously, the loss of provisioning packet information for these switches may be detrimental to the carrier's business.

When a network is in trouble, e.g., when a large percentage (80% or more) of all network communications are failing, it is very difficult to actually communicate with a device. Even if SNMP were TCP based, it would be very difficult to communicate with a device under these conditions. This is because TCP requires a number of contiguous packets to be sent and received to open a TCP session, and if many of the packets are lost, TCP would fail. However, with UDP PDUs, no setup packets are required, and advantageously, single SNMP commands can fit within a single datagram. So, if a network is in trouble, datagrams can be machine gunned at a host, and even if 90% of all packets are being lost, eventually, the SNMP command will be delivered to the device. Network Management is needed most when the network is in trouble, and this is why the datagram-based SNMP protocol is used.

Furthermore, the problem with SNMP being an unreliable protocol is that it does not support the notion of a transaction well. A transaction is a sequence of datagrams being exchanged between a manager and agent to accomplish a task. The SNMP works fine when a management task requires only one or two datagrams. However, if a management task requires a complex set of datagrams being exchanged, then an unreliable protocol does not work well, because any datagram element within the transaction can be lost in the network. A real life example of this problem is provisioning data services for telecommunications carrier customers where setting up high speed data services requires complex SNMP based transactions.

No mechanism or technique is currently available to remedy these problems. Consequently, it would be highly desirable to implement a mechanism that would virtually eliminate the loss of datagram packets transmitted over a LAN/WAN.

SUMMARY OF THE INVENTION

The present invention satisfies the above mentioned need by providing a reliable correction-oriented communications to/from a management system and vendor equipment, which have datagram based communications.

Particularly, the method and system for delivering reliable datagram service comprises the following components: a device for capturing datagrams intended to traverse the LAN/WAN; a device for extracting datagram payloads from captured datagrams, with the payloads being typically application level PDUs; a device for sending datagram payloads through LAN/WAN, by use of a reliable connection-oriented protocol, e.g., TCP/IP; and, after payload has been sent across LAN/WAN, a device for reconstructing the payload as a datagram and sending the reconstructed datagram to the intended local recipient.

Preferably, this technology may be implemented at the OS level in the kernel, or it may be implemented as an application level process. As the mechanism of the invention allows for non-intrusive hardening of existing datagram based communications, existing communications software does not have to be recompiled to use this technology, thus facilitating addition of this technology to existing systems.

Advantageously, this technology makes datagram communications reliable; therefore, it can benefit many different commercial applications.

BRIEF DESCRIPTION OF THE FIGURES

The foregoing and other features and advantages of the invention will be apparent from the following, more particular description of a preferred embodiment of the invention, as illustrated in the accompanying drawings. In the drawings, like reference numbers indicate identical or functionally similar elements.

DETAILED DESCRIPTION OF THE PREFERRED EMBODIMENTS

Figure 1:
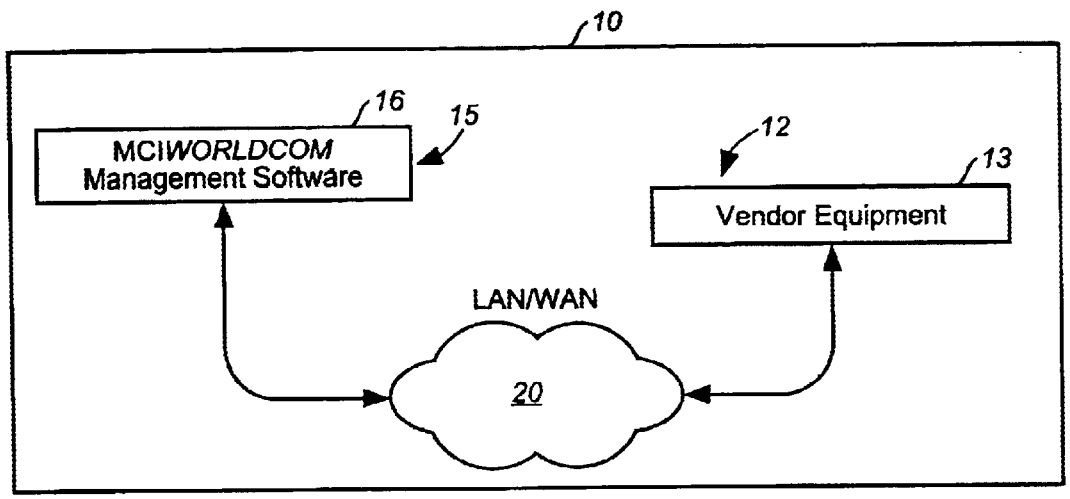
FIG. 1 illustrates a typical communications system providing datagram packet communications over a LAN/WAN between a vendor and a network manager.
Figure 2:
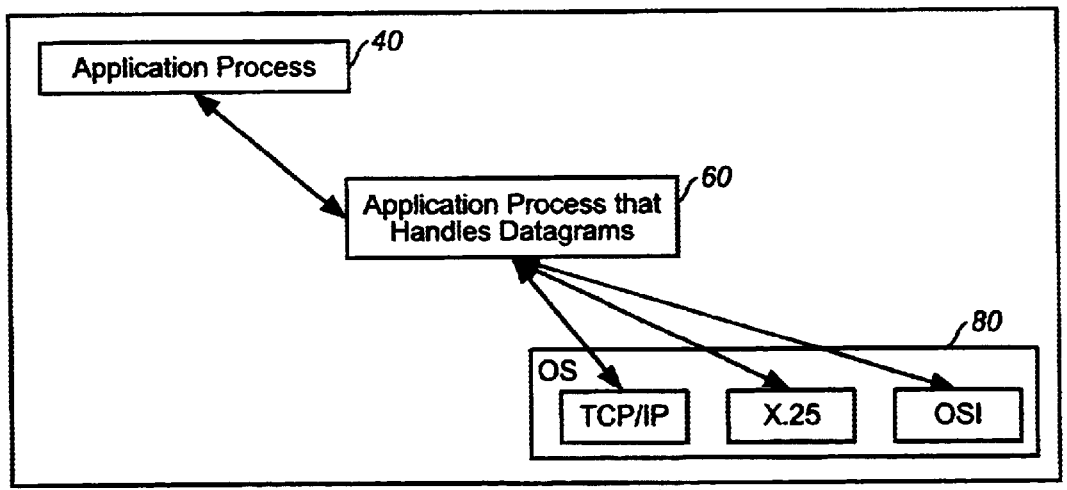
FIG. 2 a high level block diagram of the application level implementation for providing reliable datagram service according to the invention.

FIG. 2 depicts a high level block diagram of the application level implementation for providing reliable datagram service according to the invention. It is understood that the present invention may be implemented at the operating system kernel level, as well. As shown in FIG. 2, conceptually there is an application process 40, and an application level process 60 for handling datagrams destined for LAN/WAN via TCP/IP, X.25, or any other transport protocol 80, for example. With an application process implementation, an application's peer host IP address is to be changed to the local host's IP address to permit the "application level process" that handles datagrams to catch datagrams headed for the LAN/WAN, as will be described in greater detail herein.

Figure 3:
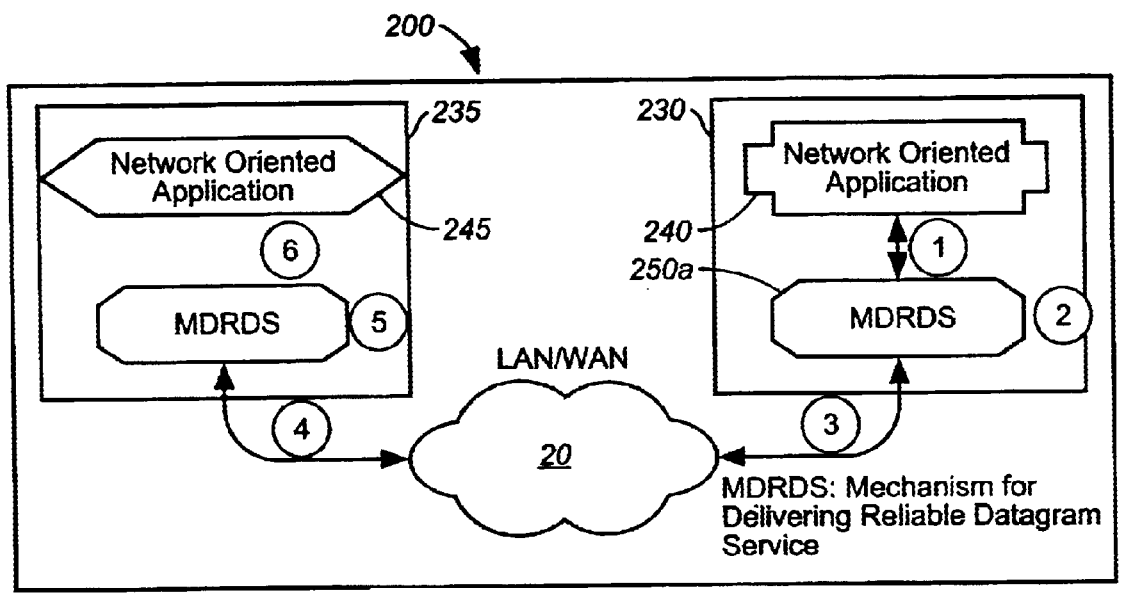
FIG. 3 is a detailed illustration of the mechanism 200 for providing reliable datagram service through a connection-oriented service according to the preferred embodiment of the invention.

FIG. 3 is a detailed illustration of the mechanism 200 for providing reliable datagram service through a connection-oriented service according to the preferred embodiment of the invention. As shown in FIG. 3 there is provided a device 230, e.g., an SNM Provisioning Server (PS) device which includes a network oriented application software 240 for generating application level datagram protocol datagram units ("PDU") packets. The generated PDU datagram packets are input to a reliable datagram service mechanism 250a which functions to strip the payload out of each datagram PDU. As an example described herein, such payload may comprise switch provisioning data information. The reliable datagram service mechanism 250a then communicates the size of the payload to be sent to a peer computing element 235 setup as a server process, which may comprise a switch device 235, e.g., an Ascend Frame/ATM switch platform (proprietary to Lucent Technology Inc.), which contains the network oriented application 245, via the LAN/WAN 20. For the given example described herein, the network oriented application 245 may include software for provisioning the network switches. It is understood however, that any application receiving a PDU datagram payload may be provided. Subsequently, the actual payload (application level PDU) is sent to the provisioning server or peer computing element 235. Specifically, as further shown in FIG. 3, a counterpart reliable datagram service mechanism 250b provided at the server 235, receives the payload size and the actual payload communicated. Then, the counterpart reliable datagram service mechanism 250b reconstructs the datagram and sends the reconstructed datagram to the local network oriented application 245, for which the information was targeted.

Figure 4:
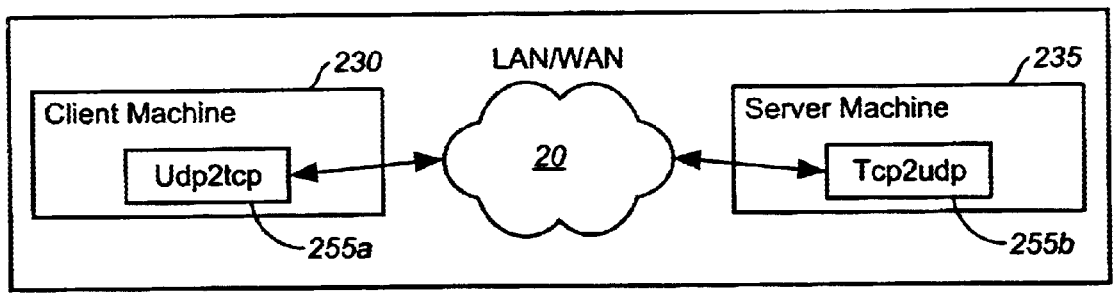
FIG. 4 illustrates an application level process for reliably delivering datagrams through a correction-oriented service.

The application level process described above for reliably delivering datagrams through a correction-oriented service is now described by way of example, as shown in FIG. 4. In this example, UDP PDU payloads are delivered over LAN/WAN 20 using the more reliable TCP/IP transport protocol, however, it is understood that any reliable transport level protocol may be implemented. As shown in FIG. 4, two processes: "udp2tcp" 255a and "tcp2udp" 255b correspond to MDRDS process 250a, 250b, respectively, as described above, with the tcp2udp 255b executable running on the server device 235, e.g., the Frame/ATM switch platform, and, the udp2tcp 255a executable running on the client device 230, e.g., the SNM Provisioning Server (PS) device.

On the client device 230, the SNM provisioning client is configured to talk to the locally implemented udp2tcp program enabling the client to believe that the udp2tcp program 255a is the switch device 235. Thus, when the client device communicates, it sends its UDP PDUs to the udp2tcp process 255a. The Udp2tcp process 255a, takes the payload data from UDP and sends it to the provisioning network application, e.g., over TCP, to the server process 235 where it is received by the tcp2udp executable 255b. As mentioned by way of example herein, the contents of the UDP packet, i.e., the payload information, is another PDU encapsulated by the UDP envelope. This may be a SNMP PDU or possibly a PDU proprietary to the client.

The tcp2udp 255b executable implemented in the server receives the UDP payload data and resends the information as a UDP PDU to the switch device 235. Thus, the switch platform 235 believes the local tcp2udp executable 255b is the remote network management (SNM) client.

The "udp2tcp" 255a and "tcp2udp" 255b processes are now described herein with greater particularity.

As described, the tcp2udp application process lives on the switch's platform, and is setup as a server process which process is invoked with the following parameters: a) a TCP Port Number for the TCP port that is used for communications over the LAN/WAN between udp2tcp and tcp2udp; b) a UDP Port Number for the UDP port which is the number used by the network-oriented application; and, c) an IP Address which is the IP address of the host running the network-oriented application. This typically will be the local host's IP address.

Figure 5:
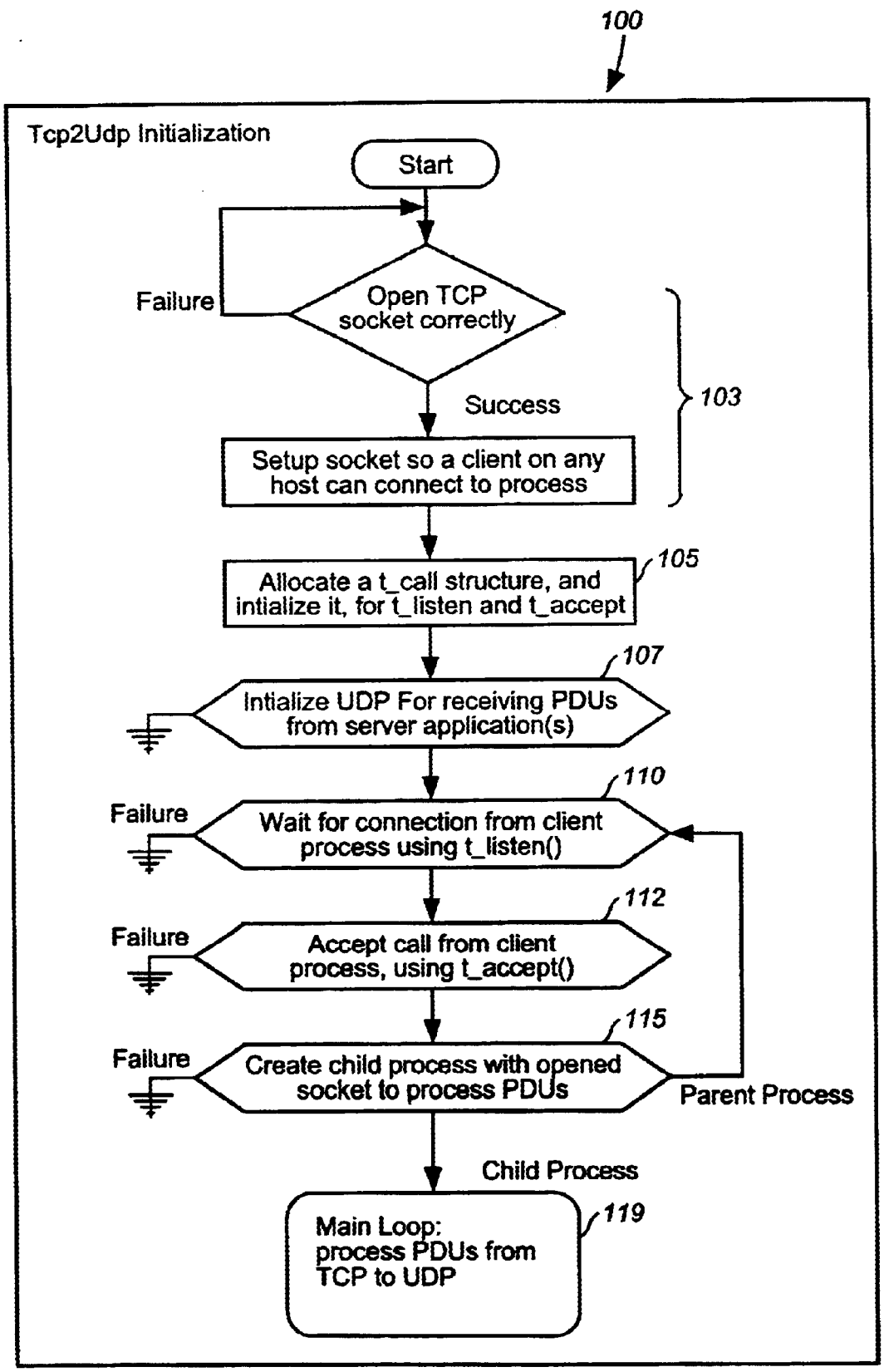
FIG. 5 illustrates the Tcp2Udp initialization process.

FIG. 5 illustrates the Tcp2Udp initialization process 100. Skilled artisans would be able to devise a similar initialization process for the Udp2Tcp executable. In FIG. 5, as indicated at a first step 103 a TCP/IP socket is opened, using a predefined TCP port number, so that any client on any host may connect to the process via LAN/WAN communications. This port is made ready to except connection requests made by udp2tcp processes located on peer hosts. At step 105, call receipt process threads are initialized for accepting connection requests from Udp2tcp processes. These process threads include: 1) a process that listens for client process connections ("t_listen"), and, 2) a process for accepting calls from the client process ("t_accept"). The next few steps are implemented to prepare for the receipt of datagrams from applications running on the client machine. Specifically, as indicated at step 107, a UDP socket is initialized using the network-oriented application's port number as follows: it opens a UDP endpoint; initializes the socket with address of the server to send datagrams; and it initializes a UDP unit data structure for sending/receiving information via UDP. Thus, a socket (software connection) is opened to enable reading and writing of UDP datagram within the server device.

After initialization is completed, the process goes into a loop, as indicated at steps 110–115, to wait for connection requests from udp2tcp, located on remote peer hosts. Particularly, as indicated at step 110, the process waits for receipt of a connection request from Udp2tcp using t_listen. A received call from the client process is accepted using t_accept function, as indicated at step 112. Next, as indicated at step 115, the tcp2udp process clones itself to generate a child tcp2udp process, so there are now two tcp2udp processes: the original process, the parent, which returns to the top of the loop to listen for more connections, and the clone (child) process, which enters a main loop 119 for sending and receiving message datagrams. It is understood that the child process is created utilizing the UNIX application utility fork ( ), for example, having the opened socket (step 103) for processing the received PDUs. After spawning the child process, described herein with respect to FIG. 6, the process then returns to step 110 so the parent may wait for further connection requests from a client process.

Figure 6:
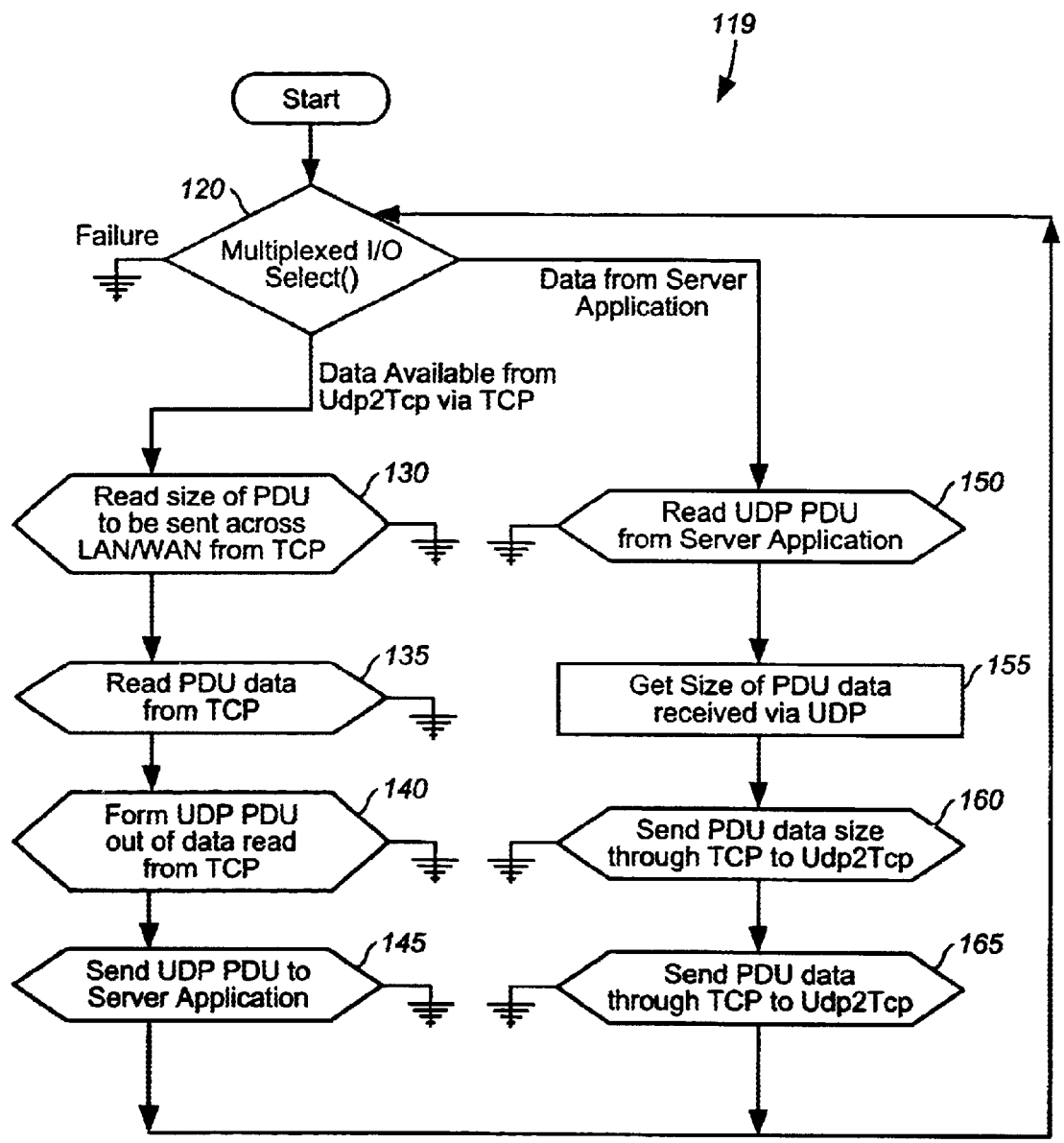
FIG. 6 is a flow chart depicting the child process for performing the actual work of moving datagram payloads through the LAN/WAN; and, FIG. 7 depicts the functionality of the present invention added to an operating system in the form of a device driver.

Specifically, the child tcp2udp process main processing loop 119 performs the actual work of moving datagram payloads through the LAN/WAN as now described in greater detail in view of FIG. 6. In the preferred embodiment, a multiplexed I/O scheme is implemented, whereby the loop watches for data to be read from either the TCP socket or from the UDP socket. Data available on the UDP socket are outgoing UDP datagrams traveling from an application on the local host across the LAN/WAN. Information available on the TCP socket is incoming application level PDUs, which have traveled across the LAN/WAN and are destined for an application on the local host.

Particularly, the Tcp2udp process is configured as a server process and may support multiple concurrent connections. That is, in the preferred embodiment, communications between the udp2tcp and tcp2udp processes is two way asynchronous multiplexed I/O, based on Select ( ) (a UNIX application utility). Thus, as shown in FIG. 6, at step 120, a decision is first made as to whether the current data received is data from the udp2tcp process across the LAN/WAN via TCP, or, is data from the server application itself. If the data available is received from the udp2tcp process, then at step 130 the size of the PDU that is expected to be transmitted across the LAN/WAN via TCP (from the udp2tcp process) is read. Then, at step 135, the actual PDU data received via the TCP connection is read, and, at step 140, an application level UDP PDU packet is formed that comprises data read from the TCP/IP. Skilled artisans may easily generate the UDP PDU packets from the parameter information and from techniques described in the reference W. Richard Stevens, "UNIX Network Programming", Prentice-Hall, Inc., 1990 (ISBN 0-12-949876-1), the whole contents and disclosure of which is incorporated by reference as if fully set forth herein. Finally, at step 145, the new application level UDP datagram is sent to the network-oriented application using the UDP socket. The process then proceeds back to step 120 for the next I/O select. It is understood that when the local server application receives the datagram, it will believe it has received information directly from its peer computing entity. It is unaware that udp2tcp and tcp2udp handled the information.

If, at step 120, data is received from the server application, i.e., information is available on the UDP socket, then, the process proceeds to step 150, where the UDP PDU (datagram) received from the local network-oriented server application is read into tcp2udp. Then, at step 155, the size of the PDU data (payload) received via the UDP is obtained, and, at step 160, the PDU data size is sent to the udp2Tcp process via the TCP connection. This allows the receiver (e.g., client) to know in advance the size of the information to be transmitted over TCP. It is understood that the size of the PDU must be successfully sent before the actual PDU can be transmitted because TCP is a reliable, stream oriented protocol. Finally, at step 165, the actual payload (PDU data) is sent to the udp2Tcp process via TCP/IP.

According to the invention, the Udp2Tcp process is virtually identical to the Tcp2Udp process described herein. That is, both Udp2Tcp and Tcp2Udp processes mirror each other as both are equipped to receive and send datagram packets via a connection-oriented protocol, e.g., TCP/IP, once a virtual connection over a network is established. Thus, the UDP2TCP application process lives on the network management platform, and is setup as a server process which process is invoked with the following parameters: a) a TCP Port Number for the TCP port that is used for communications over the LAN/WAN between udp2tcp and tcp2udp; b) a UDP Port Number for the UDP port which is the number used by the network-oriented application; and, c) an IP Address which is the IP address of the host running the network-oriented application. The Udp2Tcp initialization process is similar to the above-described initialization process relating to the Tcp2Udp executable. That is, udp2tcp first opens a TCP socket, using the LAN/WAN communications port which port is made ready to except connection requests made by tcp2udp processes located on peer hosts. Then, using the network-oriented application's port number a UDP socket is initialized. To do this, a UDP endpoint (socket) is opened and the endpoint is conditioned to receive datagram messages from any host. Then, a TCP socket is initialized with the remote host address and network-oriented application port number. A connection request is then sent over the LAN/WAN to the remote host. At this point, on the other side of the LAN/WAN the udp2tcp process accepts the connection, creates a clone process, and the clone process waits to process incoming and outgoing messages.

Thus, after udp2tcp initialization is completed, the process enters a main loop for processing incoming and outgoing messages. This loop is exactly the same as the main loop used by tcp2udp as described herein with respect to FIG. 6. That is, a multiplexed I/O scheme is implemented to determine when incoming or outgoing communications are available to be processed. Application level PDUs being sent across the LAN/WAN are done with two write operations, as discussed earlier; the first write send the size of the PDU and the second write sends the actual PDU.

Figure 7:
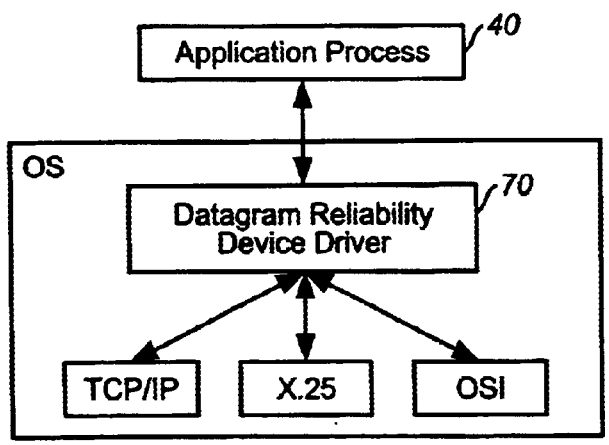

As mentioned, the present invention may be implemented at the operating system (OS) level. FIG. 7 depicts the functionality of the present invention added to the OS in the form of a device driver 70 which may provide functionality for both TCP/IP, X.25 and other Open Systems Interface communications/transport protocols. A kernel implementation is faster than when implemented as an application process.

While the invention has been particularly shown and described with reference to preferred embodiments thereof, it will be understood by those skilled in the relevant art that various changes in form and details may be made therein without departing from the spirit and scope of the invention.

What is claimed is:

1. A method for reliable delivery of datagram protocol data unit (PDU) packets locally generated by a network oriented application at a first computing network element to a second computing network element across a network, a datagram packet typically comprising a data payload, said method comprising:

(a) at said first computing network element, capturing said locally generated datagram packets destined for said second computing network element;
   (b) determining a size of said payload and communicating size of said payload to said second computing element over said network via a reliable connection-oriented transport service;
   (c) separately communicating payload to said second computing element via reliable connection-oriented transport service; and,
   (d) at said second computing network element, utilizing payload size and payload to reconstruct a datagram PDU including said payload for a network application at said second computing network element, whereby reliable datagram PDU transport over said network is ensured.

2. The method as claimed in claim 1, wherein said capturing step a) further includes the steps of:

opening a first socket connections at said first and second computing network elements; and, at said first socket connections, listening for connection requests from a local server application desiring to deliver datagram PDUs via across said network.

3. The method as claimed in claim 2, further including the steps of:

opening a second socket connection at said first and second computing network elements; and, at each said second socket connections, listening for connection requests from applications delivering datagram PDUs via said reliable transport service across said network.

4. The method as claimed in claim 3, wherein said reliable transport mechanism includes TCP/IP connection-oriented transport service.

5. The method as claimed in claim 3, wherein said reliable transport mechanism includes X.25 connection-oriented transport service.

6. The method as claimed in claim 1, wherein said step of reconstructing a datagram PDU for a network application at said second computing network element includes comparing said received payload size information with said received payload to ensure correct datagram payload delivery.

7. The method as claimed in claim 1, wherein a network element includes a switching platform, said data payload including switch provisioning information for configuring network switches.

8. A system delivery datagram protocol data units (PDU) packets generated by a network oriented application at a first computing network element to a second computing network element across a network, a datagram packet including a data payload, said method comprising:

a device at said first computing network element for capturing a generated packet destined for said second computing network element;

a mechanism for determining a size of said datagram payload and communicating size of said payload to said second computing element via a reliable connection-oriented transport mechanism, said mechanism further separately communicating datagram payload to said second computing element via said reliable connection-oriented transport mechanism; and, a device at said second computing network element for receiving said payload size information and said payload and reconstructing a datagram PDU including said payload for a network application at said second computing network element, whereby reliable datagram PDU transport over said network is ensured.

9. The system as claimed in claim 8, wherein said capturing device further includes:

means for opening a first socket connections at said first and second computing network elements; and, means for listening for connection requests from a local server application desiring to deliver datagram PDUs via across said network.

10. The system as claimed in claim 8, further including:

means for opening a second socket connection at said first and second computing network elements; and, at each said second socket connections, means for listening for connection requests from applications delivering datagram PDUs via said reliable transport service across said network.

11. The system as claimed in claim 8, wherein said reliable transport mechanism includes TCP/IP connection-oriented transport service.

12. The system as claimed in claim 8, wherein said reliable transport mechanism includes X.25 connection-oriented transport service.

13. The system as claimed in claim 8, wherein said device for reconstructing a datagram PDU for a network application at said second computing network element includes means for comparing said received payload size information with said received payload to ensure correct datagram payload delivery.

14. The system as claimed in claim 8, wherein a network element includes a switching platform, said data payload including switch provisioning information for configuring network switches.

15. A program storage device readable by a machine, tangibly embodying a program of instructions executable by the machine to perform method steps for delivering datagram protocol data unit (PDU) packets generated by a network oriented application at a first computing network element to a second computing network element across a network, a datagram packet typically comprising a data payload, said method steps comprising:

(a) at said first computing network element, capturing said generated datagram packets destined for said second computing network element;

(b) determining a size of said payload and communicating size of said payload to said second computing element via reliable connection-oriented transport service;

(c) separately communicating payload to said second computing element via reliable connection-oriented transport service; and, (d) at said second computing network element, utilizing payload size and payload to reconstruct a datagram PDU including said payload for a network application at said second computing network element, whereby reliable datagram PDU transport over said network is ensured.

16. The program storage device readable by a machine according to claim 15, wherein said capturing step a) further includes the steps of:

opening a first socket connections at said first and second computing network elements; and, at said first socket connections, listening for connection requests from a local server application desiring to deliver datagram PDUs via across said network.

17. The program storage device readable by a machine according to claim 15, further including the steps of:

opening a second socket connection at said first and second computing network elements; and, at each said second socket connections, listening for connection requests from applications delivering datagram PDUs via said reliable transport service across said network.

18. The program storage device readable by a machine according to claim 15, wherein said reliable transport mechanism includes TCP/IP connection-oriented transport service.

19. The program storage device readable by a machine according to claim 15, wherein said step of reconstructing a datagram PDU for a network application at a second computing network element includes comparing said received payload size information with said received payload to ensure correct datagram payload delivery.

* * * * *